Patented Oct. 16, 1945

2,387,019

UNITED STATES PATENT OFFICE 2,387,019

ALIPHATIC DINITRO TETROLS

Henry B. Hass, West Lafayette, Ind., and Wilbur R. McElroy, Beacon, N. Y., assignors to Purdue Research Foundation, La Fayette, Ind., a corporation of Indiana No Drawing. Application July 29, 1944, Serial No. 547,284

4 Claims. (Cl. 260—635)

The present invention relates to a group of new chemical compounds. More particularly it relates to aliphatic dinitro tetrols having the following general structural formula:

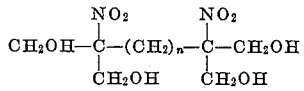

in which $n$ represents an integer less than five.

Compounds included by the above general formula and which are contemplated by the present invention are 2,4-bis(hydroxymethyl) 2,4-dinitro-1,5-pentanediol, 2,5-bis(hydroxymethyl) 2,5-dinitro-1,6-hexanediol, 2,6-bis (hydroxymethyl) 2,6-dinitro-1,7-heptanediol, 2,7-bis(hydroxymethyl) 2,7-dinitro-1,8-octanediol, and the like.

The above compounds may be synthesized by reacting formaldehyde with a dinitroalkane in which the nitro groups are each attached to a separate primary carbon atom in the presence of an auxiliary solvent such as ethyl alcohol and also in the presence of an alkaline catalyst such as sodium or calcium hydroxide. In effecting the reaction, the formaldehyde is slowly added to the solution containing the dinitroalkane and catalyst in the auxiliary solvent while thoroughly agitating. The aliphatic dinitro tetrols obtained in this manner are generally white crystalline solids and may be readily separated from the crude reaction by filtration or other convenient means.

As examples of suitable dinitroalkanes, there may be mentioned 1,3-dinitropropane, 1,4-dinitrobutane, 1,5-dinitropentane, 1,6-dinitrohexane, and the like. These dinitroalkanes are known compounds and can be synthesized in accordance with the procedure of von Braun and Sobecki (1911) which involves the reaction of powdered silver nitrite with a suitable dihaloalkane in an ether solution.

Our invention may be further illustrated by the following specific examples:

Example I

A mixture consisting of 50 ml. of absolute ethyl alcohol, 9.5 g. of 1,4-dinitrobutane and 0.2 g. of calcium hydroxide was placed in a flask cooled by ice water. The mixture was agitated while 24 g. of 35% formaldehyde was added over a period of thirty minutes. The temperature did not rise above 20° C. and the mixture, originally two phases, became a single phase. The mixture then was agitated at room temperature for eighteen hours. The solid product was filtered off and the filtrate was allowed to stand for 48 hours but no further precipitation occurred. The filtrate then was treated with carbon dioxide, heated, and filtered to remove the calcium carbonate. The solvent was distilled off and the residue was added to the first solid product, which then was crystallized from 95% alcohol. The crystallized product melted at 172–173° C. with decomposition and was obtained in a yield of 44%.

*Analysis.*—Calculated for $C_8H_{16}O_8N_2$: H, 5.4; C, 32.4; N, 10.44. Found: H, 5.4; C, 32.6; N, 10.39.

Example II 2,6-bis (hydroxymethyl) 2,6-dinitro-1,7-heptanediol was obtained by condensing formaldehyde with 1,5-dinitro-pentane in accordance with the procedure employed in Example I. The desired product was obtained in a yield of 50%. After one recrystallization from alcohol, it melted at 170–171° C.

*Analysis.*—Calculated for $C_9H_{18}N_2O_8$: H, 6.42; C, 38.29. Found: H, 6.2; C, 38.7.

Example III 2,7-bis(hydroxymethyl)-2,7-dinitro-1,8-octanediol was prepared from formaldehyde and 1,6-dinitrohexane in accordance with the procedure described in Example I. The product thus obtained was dissolved in alcohol, precipitated with petroleum ether, and then crystallized twice from a mixture of alcohol and petroleum ether. It melted at 154–155° C.

The aliphatic dinitro tetrols of my invention have been found as useful intermediates in the preparation of explosives. Other uses of these materials will be apparent to those skilled in the art.

Our invention now having been described, what we claim is:

1. Aliphatic dinitro tetrols having the formula:

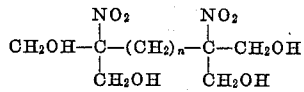

in which $n$ is an integer less than 5.

2. 2,5-bis(hydroxymethyl)-2,5-dinitro-1,6-hexanediol.

3. 2,6-bis(hydroxymethyl)-2,6-dinitro-1,7-heptanediol.

4. 2,7-bis (hydroxymethyl) - 2,7-dinitro-1,8-octanediol.

HENRY B. HASS.
WILBUR R. McELROY.